Oct. 15, 1957  P. GRANDSTAFF  2,809,518
LINE TENSIOMETER
Filed Dec. 5, 1955  3 Sheets-Sheet 1
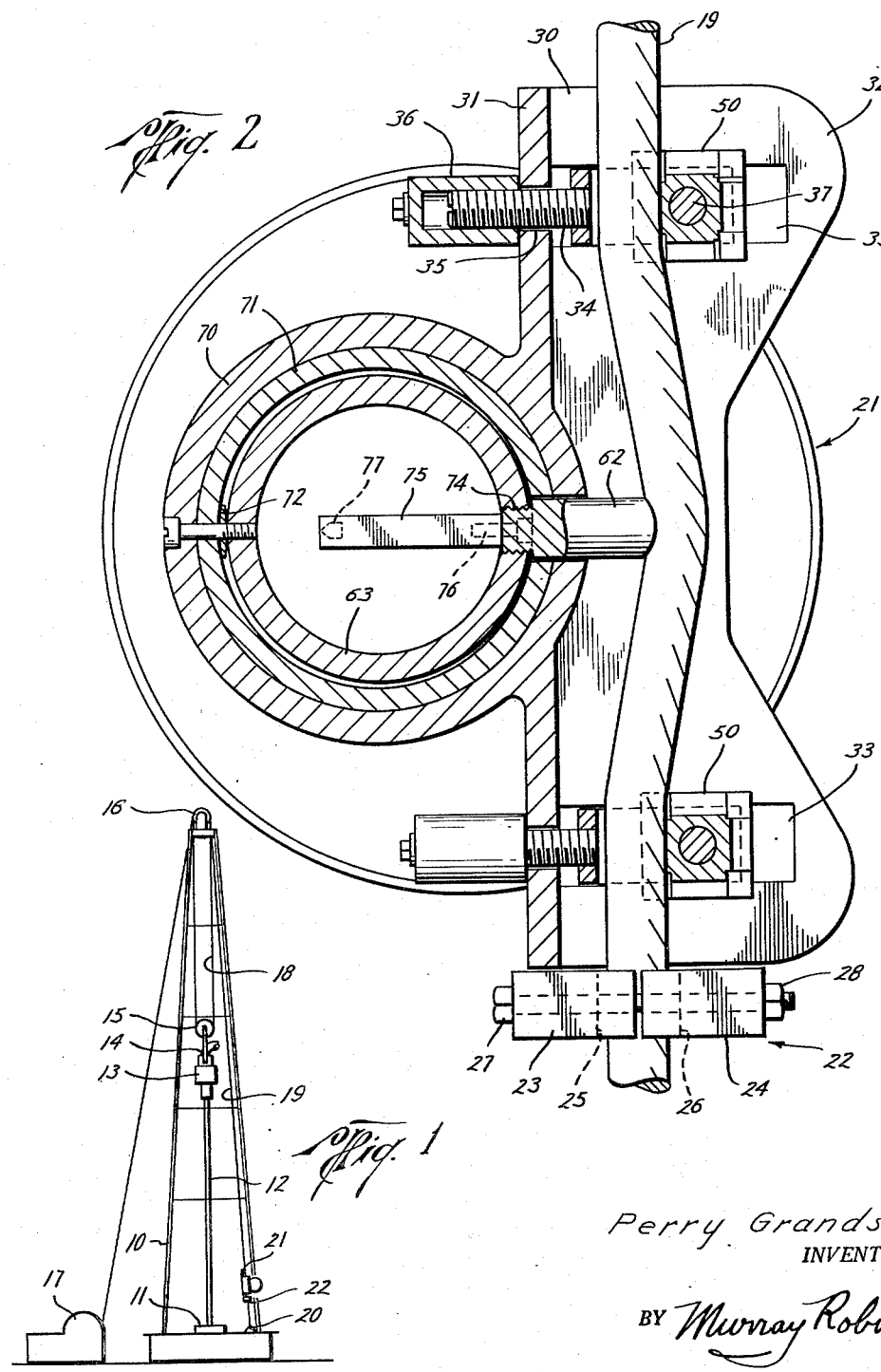
Perry Grandstaff
INVENTOR.
BY Murray Robinson
ATTORNEY Oct. 15, 1957

P. GRANDSTAFF 2,809,518

LINE TENSIOMETER

Filed Dec. 5, 1955

Perry Grandstaff
INVENTOR.

BY Murray Robinson

ATTORNEY

Oct. 15, 1957
P. GRANDSTAFF
2,809,518
LINE TENSIOMETER
Filed Dec. 5, 1955
3 Sheets-Sheet 3
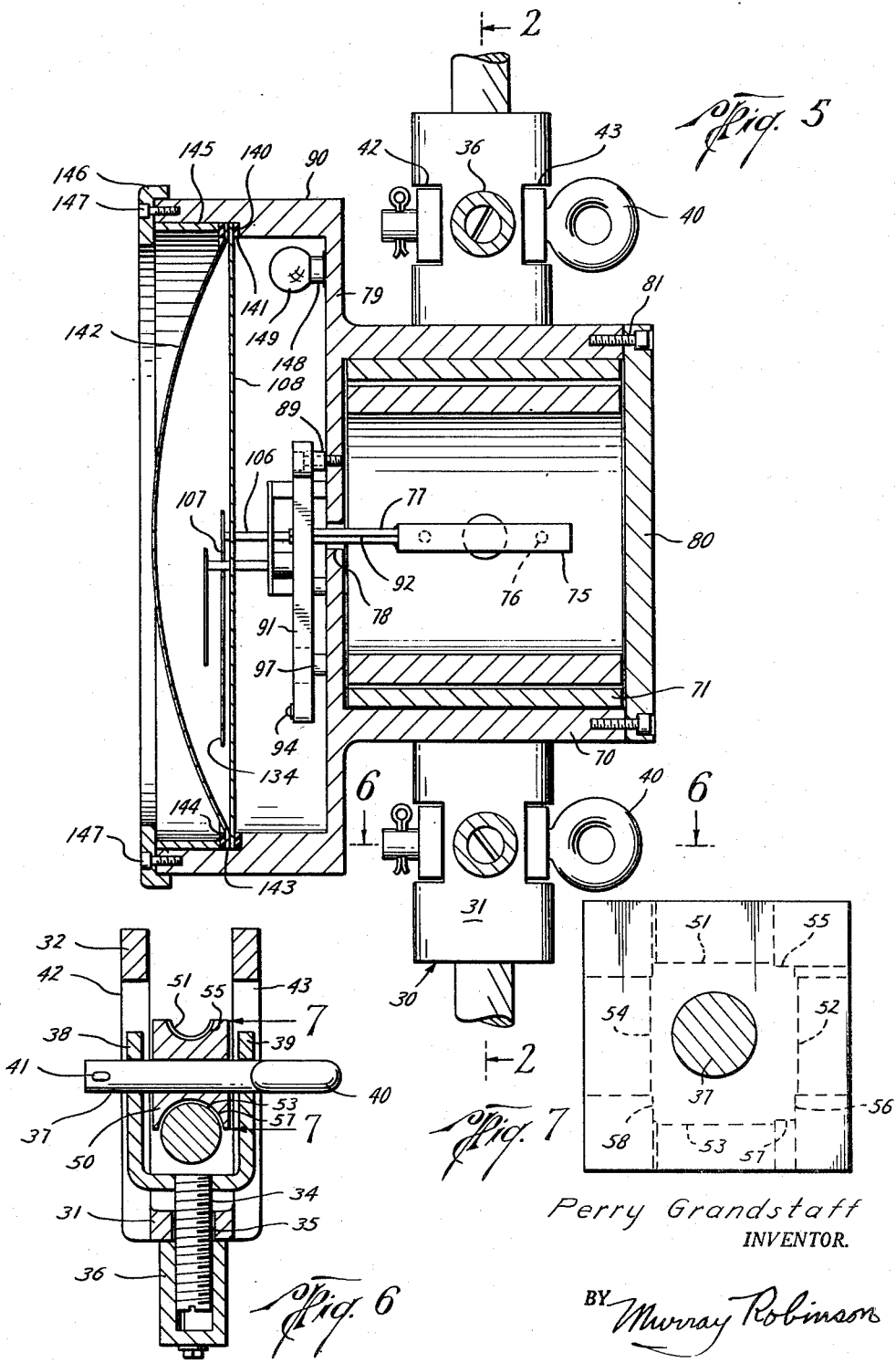
Perry Grandstaff
INVENTOR.
BY Murray Robinson
ATTORNEY

United States Patent Office 2,809,518
Patented Oct. 15, 1957

2,809,518

LINE TENSIOMETER

Perry Grandstaff, Warr Acres, Okla., assignor to Line Scale Company, Inc., Oklahoma City, Okla., a corporation of Oklahoma Application December 5, 1955, Serial No. 550,905

9 Claims. (Cl. 73—144)

This invention pertains to a device for measuring the tension in a line or cable and in particular to a device responsive to the tension in the dead line of a block and tackle used to support a string of drill pipe used in the rotary system of drilling, the device being calibrated to indicate the portion of the weight of the drill pipe supported by the traveling block, from which the portion of the weight of the drill pipe supported by the drill bit can be calculated by subtracting the weight supported by the traveling block from the total weight of the drill pipe. Such a device is generally called a weight indicator.

It is a principal object of the invention to provide such a device having a linear scale, as distinguished from one in which the graduations marking equal force increments are crowded together at one end of the scale and spread far apart at the other.

A further object of the invention is to provide such a device that is accurate and at the same time rugged.

Another object of the invention is to provide such a device that is readily adjustable to fit lines of different diameter.

A further object of the invention is to provide such a device that is readily adjustable to give correct indications with different numbers of lines between the traveling block and crown block.

Other objects and advantages of the invention will appear from the following description of a preferred embodiment thereof, reference being made to the accompanying drawings wherein:

Figure 1 is an elevation of a well drilling rig illustrating the use of a device embodying the invention;

Figure 2 is a vertical section through said device taken on line 2—2 of Figure 5, looking at the back of the device;

Figure 5 is a section taken on line 5—5 of Figure 3;

Figure 6 is a section taken on line 6—6 of Figure 5; and

Figure 7 is a section taken on line 7—7 of Figure 6, but to a larger scale.

Figures 3, 4:
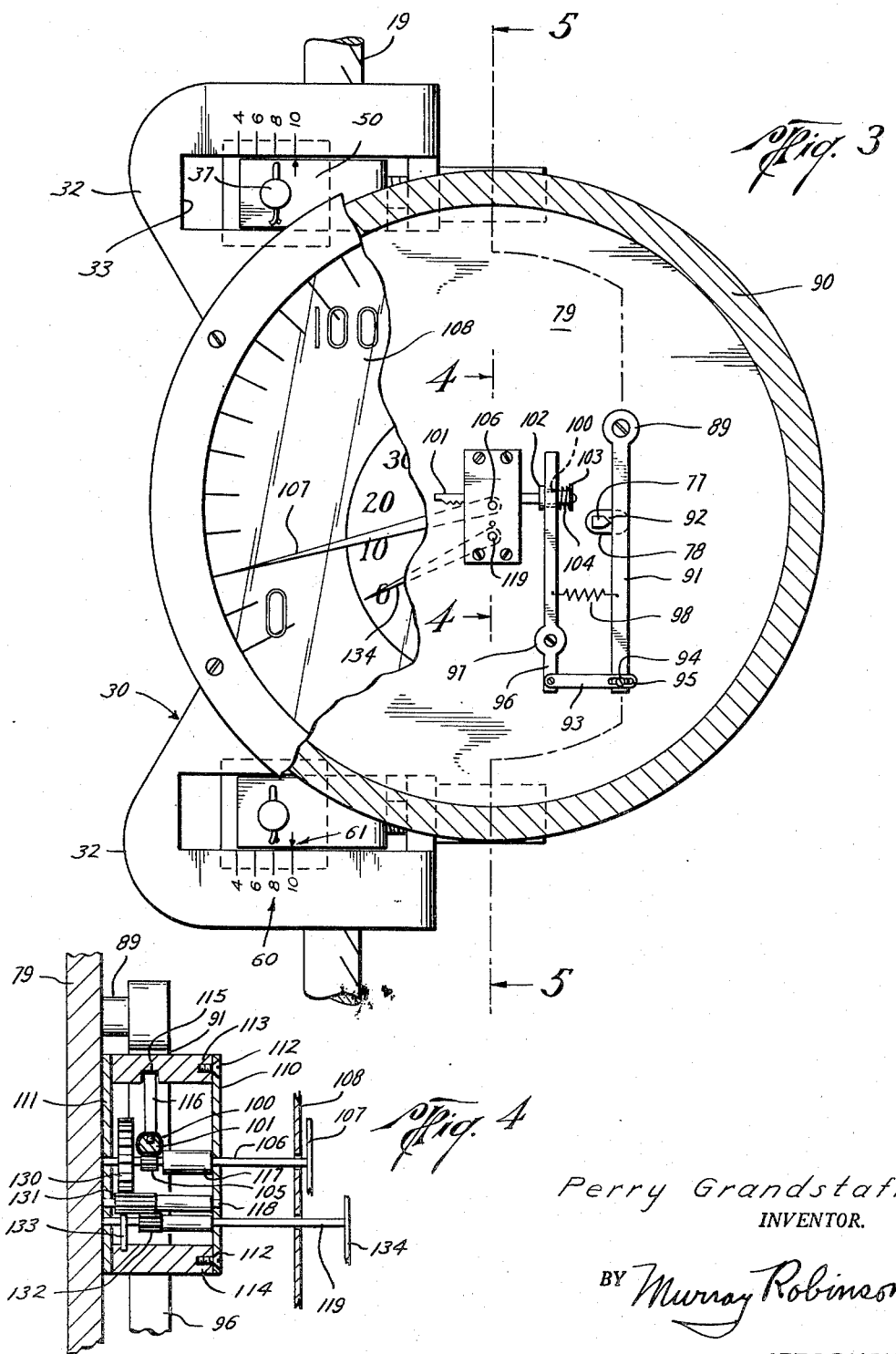
Figure 3 is a front view of the device with the cover largely broken away.
Figure 4 is a view taken on line 4—4 of Figure 3.

Referring now to Figure 1, there is shown a well drilling rig including a derrick 10, rotary table 11, drill pipe 12, swivel 13, hook 14, traveling block 15, crown block 16, dead line 19, cable loops 18, and draw works 17. The dead line is anchored at 20. The weight indicator 21 is connected to the dead line and supported against sliding down thereon by a cable clamp 22.

Referring now to Figure 2, the weight indicator 21 is shown disposed on dead line 19 and supported by clamp 22. The clamp comprises two blocks 23, 24 with V-shaped notches 25, 26 therein to grasp the cable and held together by a pair of bolts and nuts such as 27, 28.

Referring also to Figures 5 and 6 as well as Figure 2, the weight indicator comprises a channel shaped body 30 adapted to be disposed over line 19, the bottom 31 of the channel appearing in section in Figure 2 and the inner face of one side 32 of the channel appearing in elevation.

Within the two ends of the channel are two identical forks 33. Each fork has a threaded stud 34 at its base passing through a hole 35 in the bottom of the channel and engaging a round nut 36. A pin 37 passes through the two legs 38, 39 of the fork, being held against axial movement by an eye 40 at one end and a cotter pin 41 at the other. The sides of the channel 30 are cut away at 42, 43 to provide openings for the legs of the fork, as best shown in Figures 5 and 6.

On each pin 37 is rotatably mounted a rocker block 50. The four radially facing sides of the block are provided with semi-cylindrical grooves of different diameters adapted to engage different diameter cables, the grooves being shown in Figure 7 at 51—54. The corners of the block are grooved to slightly greater depths as shown at 55—58 to provide clearance between the line and corners of the blocks. The grooves 51—54 are cut with axes that are equidistant from the centers of the pins 37 so that regardless of line diameter the axes of the line will be in the same position relative to pins 37.

Referring now to Figure 3, there are calibrations 60 on the face 32 of channel shaped body 30 adjacent each of the openings 42, 43, against which the positions of the forks 33 can be judged by comparison with reference 61. By changing the position of the forks 33 the apparatus can be adapted to give correct scale readings with different numbers of cable loops 18. As shown in Figure 2 the cable 19 is caused to pass between rocker blocks 50 and a push rod 62 which bears against a proving ring 63 whose elastic deformations produce pointer movements over a weight scale as hereinafter described in detail. By increasing the misalignment of rocker blocks 50 and push rod 62, which is done by moving forks 33 nearer to the bottom 31 of the channel shaped body 30, the kink in cable 19 is indicated. This in turn increases the ratio of force on the push 62 to tension in the cable 19. This ratio must be increased as the number of cable loops is increased, and to effect the proper increase the forks 33 are moved to the required position as indicated by alignment of the references 61 and the proper calibration 60.

Referring now to Figures 2 and 5, there is a cylindrical housing 70 cast integral with channel shaped body 30. Since body 30 and housing 70 are preferably made of a light weight metal such as aluminum, the housing is reinforced with a steel bushing 71. Proving ring 63 is mounted inside bushing 71 between push rod 62 and shim 72. There is a screw 73 passing through the housing, bushing, and shim into the proving ring at one side. The push rod 62 extends through the housing and bushing at the other side of the proving ring and a threaded stud 74 on the push rod is screwed into the proving ring on that side. A bracket 75 fastened to the inside of the proving ring by screws 76 carries actuating rod 77 which passes through an opening 78 in wall 79 which closes one end of housing 70. The other end of the housing 70 is closed by a cover plate 80 held to the housing 70 by screws 81.

Referring now to Figures 3 and 5, the wall 79 forms the bottom of a cylindrical case 90. There is lever 91 pivotally mounted at 89 on wall 79. A knife edge 92 formed on actuating arm 77 bears against lever 91, moving it to the right in Figure 3 as the proving ring deformation increases. The end of lever 91 is adjustably secured to link 93 by screw 94 passing through slot 95. Link 93 is pivotally connected to lever 96 pivotally mounted at 97 on wall 79. Lever 96 is resiliently connected to lever 91 by tension spring 98 which biases both levers clockwise as viewed in Figure 3 and thus keeps lever 91 in engagement with knife edge 92.

Referring now to Figures 3 and 4, the end of lever 96 opposite from the end connected to link 93 has a hole 100 therein through which passes a rack 101 of circular cross section. A ring 102 is clamped to the rack forming an abutment against which the end of lever 96 bears so that counterclockwise movement of lever 96 as viewed in Figure 3 moves the rack 101 to the left. A washer 103 is secured to the end of the rack by a screw. A helical compression spring 104 is disposed around the end of the rack between washer 103 and lever 96 whereby when the lever 96 moves clockwise as viewed in Figure 3 the rack is resiliently urged to the right. The spring 104 thus acts as a shock absorber in case of any sudden lessening of the tension in cable 19.

As shown in Figure 4, rack 101 drives pinion 105 on shaft 106 to which is connected long pointer 107 which moves over the face of circular dial 108 mounted in case 90. Pointer 107 is the slow moving pointer of the weight indicator and the outer portion of the dial is graduated in ten thousands of pounds over a range from zero to three hundred thousand pounds.

Shaft 106 is rotatably mounted in bearing plates 110, 111 secured to wall 79 by screws 112 and plate 111 is held in the desired spaced relationship with respect to plate 111 by blocks 113, 114. There is a guide slot 115 in block 113 which receives a guide strip 116 secured to the top of rack 101. Shaft 106 is enlarged at 117 providing a shoulder to prevent axial displacement of the shaft toward the right. Axial movement to the left is blocked by wall 79. An idler shaft 118 and another pointer shaft 119 are similarly rotatably mounted in bearing plates 110, 111.

A gear 130 on shaft 106 drives pinion 131 on the idler shaft and pinion 131 also engages and drives pinion 132 on shaft 119. A spiral torsion spring 133 takes up any backlash. Shaft 119 carries pointer 134 which is the fast moving pointer and moves over the center portion of dial 108 which, though also graduated in ten thousands of pounds has its graduations spread farther apart and covers a range of only zero to one hundred thousand pounds. While pointer 107 is making two thirds of a revolution to cover the full range of its scale, pointer 134 makes three complete revolutions over its scale, the gear ratio being 4½ to 1.

Referring now to Figure 5, the casing 90 has an internal annular shoulder 140 on which is disposed a synthetic rubber gasket 141. Dial 108, which is made of transparent or translucen plastic, is mounted on gasket 141. A spherical glass cover 142 is disposed over dial 108. There is a flange 143 on the periphery of the cover which rests against the dial 108 and over flange 143 is disposed a synthetic rubber gasket 144. A compression ring 145 bears against gasket 144 and is helde thereagainst by a flanged hold down ring 146 which is secured to the case 90 by a plurality of screws 147. Within the case on wall 79 is an electric light socket 148 in which is disposed light bulb 149. The socket may be connected to any source of electricity.

In use, the weight indicator is placed on the cable 19 by removing rockers 50 and slipping the body 30 and forks 33 around the cable and then replacing the rockers 50, the latter being turned so that the correct size groove is adjacent the cable. The forks are adjusted to position the rockers relative to the push rod 62 correctly for the number of cable loops 18 that are used. The proving ring 63 has sufficient size and strength so that its deflection under cable tension corresponding to the full capacity of the weight indicator will be very slight. Therefore the ratio of the push rod force to the cable tension will remain substantially constant throughout the full range of deflections of the weight indicator. Also, since the deflections of the proving ring are slight, the deflection amplification means comprising levers 91, 96, and link 93 give a nearly constant amplification ratio. It will be noted that levers 91 and 96 are substantially parallel and that knife edge 92 and rack 101 and link 93 move perpendicular thereto which gives a linear amplification over small displacements. By virtue of the constant ratio of force on the push rod to cable tension and the constant amplification ratio, the scales of the visual indication means comprising the pointers 107, 124 and the dial 98 are linear.

While a preferred embodiment of the invention has been shown and described, many modifications thereof can be made by one skilled in the art without departing from the spirit of the invention and it is desired to protect by Letters Patent all forms of the invention falling within the scope of the following claims.

I claim:

1. Deflection producing means responsive to line tension comprising a proving ring and means reacting on the proving ring to support a kink in the line, whereby line tension causes deflection of the proving ring, said reacting means comprising a support for the proving ring at one side thereof, means bearing against the opposite side of the proving ring and adapted to bear against a portion of the cable, and means adapted to engage the cable at portions spaced from the first said portion thereof and on opposite sides of said first portion, the last said means being connected to said support for the proving ring, said proving ring being disposed entirely to one side of a straight line joining the cable contacting portions of the last said means.

2. Deflection producing means responsive to line tension comprising a proving ring and means reacting on the proving ring to support a kink in the line, whereby line tension causes deflection of the proving ring, said reacting means comprising a support for the proving ring at one side thereof, means bearing against the opposite side of the proving ring and adapted to bear against a portion of the cable, and means adapted to engage the cable at portions spaced from the first said portion thereof and on opposite sides of said first portion, the last said means being connected to said support for the proving ring, said support comprising a cylindrical housing surrounding said proving ring and a channel shaped body adapted to receive a cable.

3. Deflection producing means responsive to line tension comprising a proving ring and means reacting on the proving ring to support a kink in the line, whereby line tension causes deflection of the proving ring, said reacting means comprising a support for the proving ring at one side thereof, means bearing against the opposite side of the proving ring and adapted to bear against a portion of the cable, and means adapted to engage the cable at portions spaced from the first said portion thereof and on opposite sides of said first portion, the last said means being connected to said support for the proving ring, said support comprising a cylindrical housing surrounding said proving ring, a channel shaped body adapted to receive a cable, a cylindrical case coaxial with said cylindrical housing and a wall between said housing and case transverse to the axis thereof, said case having a visual indicating means therein comprising a pointer and dial, said housing having means therein responsive to deflections of the proving ring for amplifying said deflections and driving said visual indicating means in response thereto.

4. Deflection producing means responsive to line tension comprising a proving ring and means reacting on the proving ring to support a kink in the line, whereby line tension causes deflection of the proving ring, said reacting means comprising a support for the proving ring at one side thereof, means bearing against the opposite side of the proving ring and adapted to bear against a portion of the cable, and separate means adapted to engage the cable at portions spaced from the first said portion thereof and on opposite sides of said first portion, the last said means being connected to said support for the proving ring, means slidably mounting each of the last said means on said support for straight line motion perpendicular to the line joining said spaced apart portions, and means positionable by an operator and maintained in position without an operator for locating each of said mounting means in a desired position relative to said support along said perpendicular.

5. Deflection producing means responsive to line tension comprising a proving ring and means reacting on the proving ring to support a kink in the line, whereby line tension causes deflection of the proving ring, said reacting means comprising a support for the proving ring at one side thereof, means bearing against the opposite side of the proving ring and adapted to bear against a portion of the cable, and means adapted to engage the cable at portions spaced from the first said portion thereof and on opposite sides of said first portion, the last said means being connected to said support for the proving ring, the last said means comprising a pair of blocks, means pivotally mounting each said block on said support, each block having a plurality of grooves disposed at different parts of its periphery each groove being semi-cylindrical, the diameter of the grooves being different but the radial distance of the cylinder axis of each groove from the pivot axis of the block being the same.

6. A line tension indicator including deflection producing means responsive to line tension comprising a proving ring and means reacting on the proving ring to support a kink in the line, whereby line tension causes deflection of the proving ring, the ratio of force on said reacting means to line tension of said deflection producing means being substantially constant over the full range of said indicator, and means responsive to deflection of the proving ring to give an indication of line tension including a linear deflection amplification means driving a moving element of a visual indication means, said visual indication means having a linear scale, said linear amplification means comprising a knife edge secured to the proving ring in position to move on deflection of the proving ring, a pivotally mounted lever disposed at right angles to the direction of motion of said knife edge and in engagement therewith, a link pivotally connected to a part of said lever on the same side of the pivot point thereof as said knife edge but at a greater distance from the pivot point than said knife edge, a second lever parallel to the first said lever and pivotally mounted intermediate its ends, said second lever being pivotally connected at one part to said link, said link being perpendicular to said levers, another part of said second lever driving the visual indication means, the pivotal mounting of said second lever being closer to the first said part than to the second said part thereof.

7. Deflection producing means responsive to line tension comprising a proving ring and means reacting on the proving ring to support a kink in the line, whereby line tension causes deflection of the proving ring, said reacting means comprising a support for the proving ring at one side thereof, means bearing against the opposite side of the proving ring and adapted to bear against a portion of the cable and means adapted to engage the cable at portions spaced equally from said first portion thereof and on opposite sides of said first portions, the last said means being connected to said support comprising a channel shaped body adapted to receive a cable, means providing for straight line motion of said last means perpendicular to the line joining said spaced apart portions comprising slots in the side of said support, said means adapted to engage a cable comprising a two pronged fork slidably mounted in each of said slots, having rocker blocks pivotally mounted between the prongs thereof and perpendicular thereto, said rocker blocks each having a plurality of semi-cylindrical grooves disposed at different parts of its periphery, the diameter of said grooves being different but the radial distance of the cylinder axis of each groove from the pivotal axis of the block being the same.

8. A line tension indicator including deflection producing means responsive to line tension comprising a proving ring, means reacting upon the proving ring to support a kink in the line whereby line tension reacts upon said means with a substantially constant ratio of force over the full range of said indicator causing deflection of said proving ring, means responsive to deflection of the proving ring including linear deflection amplification means driving a moving pointer of a visual indication means registering upon a linear scale comprising a dial calibrated in equal increments.

9. A line tension indicator including deflection producing means responsive to line tension comprising a proving ring disposed within a cylindrical housing integral with a channel body cast of light metal alloy adapted to receive a cable, a hollow elongated cylindrical steel bushing disposed between said proving ring and said cylindrical housing, the outside diameter of said steel bushing corresponding closely with the inside diameter of said cylindrical housing, means to transmit force exerted by tension in said cable through said bushing to said proving ring and means responsive to deflection of said proving ring to indicate the magnitude of said force.

References Cited in the file of this patent

UNITED STATES PATENTS

| | | |
|---|---|---|
| 2,043,953 | Harrall | June 9, 1936 |
| 2,063,169 | Kemler | Dec. 8, 1936 |
| 2,118,727 | Hanes | May 24, 1938 |
| 2,285,471 | Sturgess | June 9, 1942 |
| 2,401,876 | Marker | June 11, 1946 |
| 2,471,999 | Boos | May 31, 1949 |